June 20, 1950  L. G. RILEY  2,512,381
SERIES PARALLEL CONTROL SYSTEM
Filed May 21, 1948  2 Sheets-Sheet 1

WITNESSES:
Robert C. Baird

INVENTOR
Lynn G. Riley
BY G. M. Crawford
ATTORNEY

Patented June 20, 1950

2,512,381

UNITED STATES PATENT OFFICE 2,512,381

SERIES PARALLEL CONTROL SYSTEM

Lynn G. Riley, Pittsburgh, Pa., assignor to Westinghouse Electric Corporation, East Pittsburgh, Pa., a corporation of Pennsylvania Application May 21, 1948, Serial No. 28,485

10 Claims. (Cl. 318—63)

My invention relates, generally, to control systems, and more particularly, to systems for controlling the operation of electric motors which are arranged for series-parallel operation during acceleration and for dynamic braking during deceleration.

An object of my invention, generally stated, is to provide a control system which shall be simple and efficient in operation, and which may be economically manufactured and installed.

A more specific object of my invention is to provide a simplified and improved series-parallel control system of the accelerator type.

Another object of my invention is to provide bridging transition from series to parallel operation of motors which are controlled by accelerators.

A further object of my invention is to utilize a plurality of motor-driven accelerators for controlling the propelling motors of an electric vehicle.

Still another object of my invention is to control the dynamic braking of the motors by multi-notch shunting of the motor field windings.

Other objects of my invention will be explained fully hereinafter or will be apparent to those skilled in the art.

According to one embodiment of my invention, the propelling motors of an electric vehicle are arranged for series-parallel acceleration with bridging transition, and also for dynamic braking with the armature of one motor energizing the field winding of the other motor. The accelerating and braking resistance is cut out of the motor circuits by two accelerators which are operated in unison by one pilot motor. The accelerators travel in one direction during acceleration and in the opposite direction during braking. Multi-notch field shunting is provided for high speed running and braking regulation.

For a better understanding of the nature and objects of my invention, reference may be had to the following detailed description, taken in conjunction with the accompanying drawings, in which.

Figure 1:
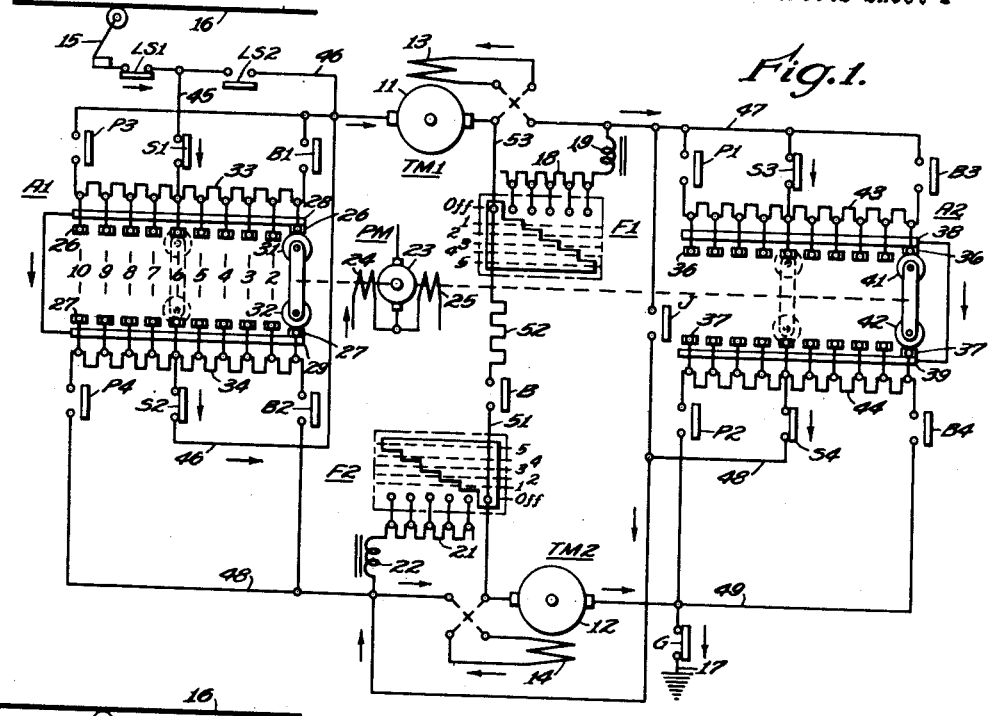
Figure 1 is a diagrammatic view showing the main circuit connections for the motors and control apparatus of a system embodying the principal features of my invention, the motors being connected in series-circuit relation.

Referring to the drawings, and particularly to Fig. 1, the system shown therein comprises two traction motors TM1 and TM2 which may be utilized for propelling an electric vehicle (not shown). The motors are of the series type having armature windings 11 and 12 and series field windings 13 and 14, respectively. A line switch LS1 is provided for connecting the motors to a current collecting device 15 which engages a trolley conductor 16. A switch G is provided for connecting the motors to a ground connection 17, thereby completing the circuit to a source of power, such as a power generating system (not shown).

Figures 3, 4:
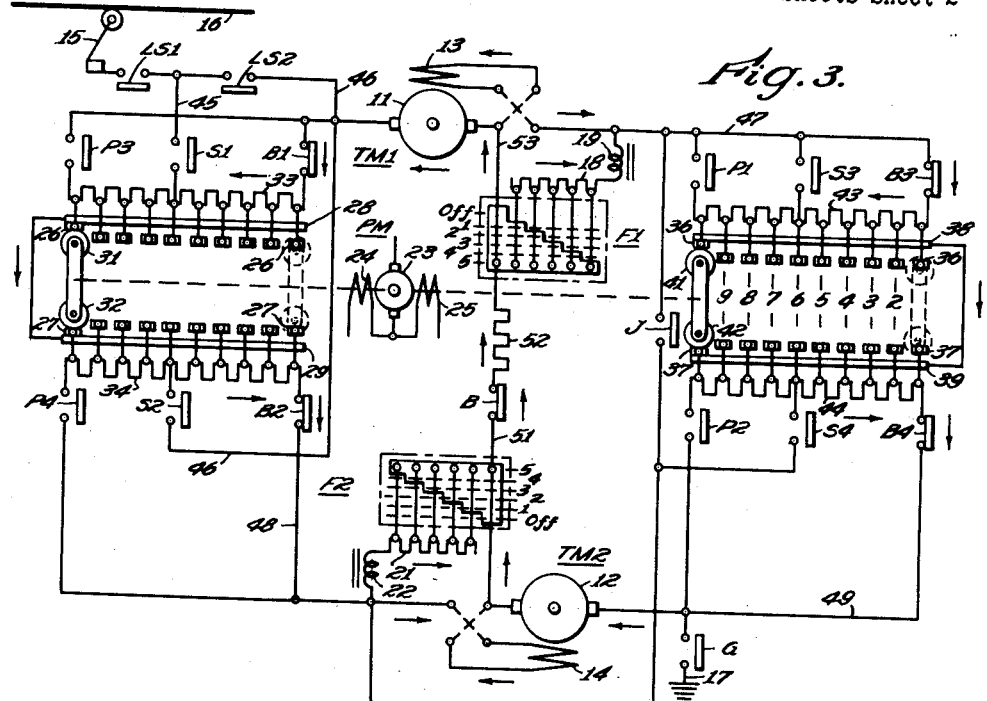
Fig. 3 is a diagrammatic view showing the dynamic braking circuit connections for the motors; and, Fig. 4 is a chart showing the sequence of operation of the apparatus illustrated in Figs. 1, 2 and 3.

As indicated in the sequence chart in Fig. 4, the motors TM1 and TM2 are first connected in series-circuit relation and then in parallel-circuit relation during acceleration of the vehicle. In addition to the switches LS1 and G, switches S1, S2, S3 and S4 are provided for connecting the motors in series-circuit relation. Bridging transition of the motors is obtained by switches LS2 and J, the switch J being closed only during the transition period. The parallel-circuit connections are established through switches LS1, G, LS2, P1, P2, P3 and P4.

The motors may also be connected for dynamic braking with the field winding 14 connected across the armature winding 11 and the field winding 13 connected across the armature winding 12, thereby permitting the current in the armature windings to reverse and cause the motors to act as generators and retard the vehicle. A switch B, together with switches B1, B2, B3 and B4 are provided for establishing the dynamic braking connections.

Provision is made for shunting the series field windings of the motors during portions of the accelerating and braking cycles by means of multi-step controllers F1 and F2. The shunt circuit for the field winding 13 comprises a resistor 18 and a reactor 19. As shown, the resistor 18 may be shunted step-by-step by means of the controller F1. The shunt circuit for the series field winding 14 comprises a resistor 21 and a reactor 22. The resistor 21 may be shunted step-by-step by the controller F2. The controllers F1 and F2 may be operated by an air engine or other suitable device (not shown).

The motor current during both acceleration and dynamic braking is controlled by two accelerators A1 and A2. The accelerators are of the same general type as the one disclosed in my Patent No. 1,991,229. The two accelerators may be operated in unison by a pilot motor PM. The pilot motor is provided with an armature winding 23 and two field windings 24 and 25, one for each direction of rotation. Power for operating the pilot motor may be obtained from a storage battery or other suitable source.

The accelerator A1 comprises two duplicate sets of contact fingers 26 and 27 which are progressively forced against busses 28 and 29, respectively, by rollers 31 and 32, respectively. As previously explained, the rollers 31 and 32 are driven by the pilot motor PM. As shown, the accelerator A1 is provided with two resistors 33 and 34. The resistor 33 is divided into a number of subdivisions or steps which are connected to the contact fingers 26. Likewise, the resistor 34 is divided into a plurality of steps which are connected to the contact fingers 27.

The accelerator A2 comprises contact fingers 36 and 37 which are progressively forced against busses 38 and 39, respectively, by rollers 41 and 42, respectively. The rollers 41 and 42 are driven by the pilot motor PM, as previously explained. The accelerator A2 is provided with resistors 43 and 44. The resistor 43 is divided into a plurality of subdivisions or steps which are connected to the contact fingers 36. Likewise, the resistor 44 is divided into steps which are connected to the contact fingers 37.

As shown, the switches S1 and S2 are connected to intermediate taps on the resistors 33 and 34, respectively. The switches P3 and P4 are connected to end terminals of the resistors 33 and 34, respectively, and the switches B1 and B2 are connected to the other end terminals of the resistors 33 and 34, respectively. Likewise, the switches S3 and S4 are connected to intermediate taps on the resistors 43 and 44, respectively. The switches P1 and P2 are connected to end terminals of the resistors 43 and 44, respectively, and the switches B3 and B4 are connected to the opposite end terminals of the resistors 43 and 44, respectively. In this manner, the foregoing switches cooperate with the accelerators in establishing the series, the parallel and the dynamic braking connections for the traction motors TM1 and TM2.

As shown in Fig. 1, the traction motors TM1 and TM2 are connected in series-circuit relation when the switches LS1, G, S1, S2, S3 and S4 are closed. As indicated by the arrows, the motor circuit extends from the trolley conductor 16 through the current collector 15, the switch LS1, conductor 45, the switch S1, a portion of the resistor 33, one of the contact fingers 26 which is pressed against the bus 28, the busses 28 and 29, one of the contact fingers 27, a portion of the resistor 34, switch S2, conductor 46, the armature winding 11 and the series field winding 13 of the motor TM1, conductor 47, the switch S3, a portion of the resistor 43, contact finger 36 which engages the bus 38, contact finger 37 which engages the bus 39, a portion of the resistor 44, switch S4, conductor 48, the series field winding 14 and the armature winding 12 of the motor TM2, conductor 49 and the switch G to the grounded conductor 17.

As indicated by the sequence chart in Fig. 4, the accelerators A1 and A2 travel from position 1 to position 6 during series operation of the motors, thereby shunting the resistors 33, 34, 43 and 44 from the motor circuit step-by-step. When the accelerators are on position 6, the switches LS2 and J are closed to establish the bridging transition for the motors.

Following the closing of the switches LS2 and J, the switches S1, S2, S3, and S4 are opened. At this time, the motor circuit extends from the conductor 45 through the switch LS2, conductor 46, the armature winding 11 and the series field winding 13 of the motor TM1, conductor 47, the switch J, conductor 48, the series field winding 14 and the armature winding 12 of the motor TM2, conductor 49 and the switch G to ground at 17.

Figure 2:
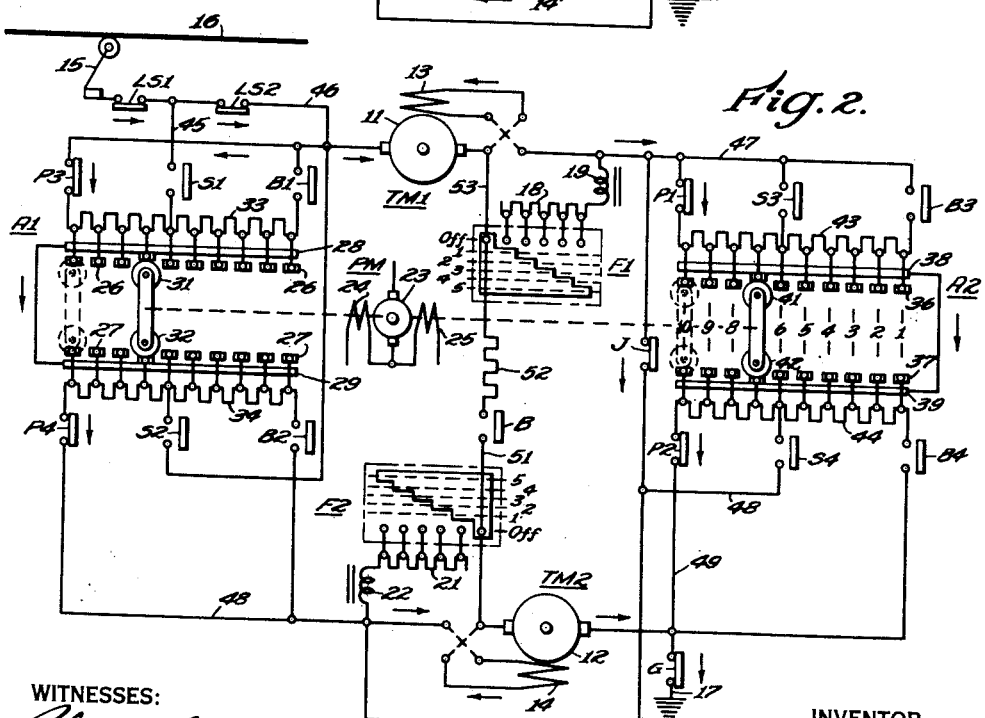
Fig. 2 is a diagrammatic view, similar to Fig. 1, showing the motors connected in parallel-circuit relation.

Following the opening of the switches S1, S2, S3 and S4, the switches P1, P2, P3 and P4 are closed, thereby completing the transition from the series to the parallel connections for the motors TM1 and TM2. As shown by the arrows in Fig. 2, the circuit for the motor TM1 extends from the conductor 46, through the motor TM1, conductor 47, the switch P1, a portion of the resistor 43, one of the contact fingers 36 which is pressed against the bus 38 by the roller 41, the busses 38 and 39, one of the contact fingers 37 which is pressed against the bus 39 by the roller 42, a portion of the resistor 44, the switch P2, conductor 49 and the switch G to ground at 17.

The circuit for the motor TM2 extends from the conductor 46 through the switch P3, a portion of the resistor 33, one of the contact fingers 26 which is pressed against the bus 28 by the roller 31, the busses 28 and 29, one of the contact fingers 27 which is pressed against the bus 29 by the roller 32, a portion of the resistor 34, the switch P4, conductor 48, the motor TM2, conductor 49 and the switch G to the grounded conductor 17.

As indicated by the sequence chart in Fig. 4, the accelerators A1 and A2 travel from position 7 to position 10 during parallel operation of the motors, thereby shunting the remainder of resistors 33, 34, 43 and 44 from their respective motor circuits. After the accelerators reach position 10, the controllers F1 and F2 are operated through positions 1 to 5 first to establish shunt circuits for the field windings 13 and 14 and then to shunt the resistors 18 and 21 from the field shunting circuits step-by-step. In this manner, the maximum speed of the motors TM1 and TM2 is obtained.

If it is desired to permit the motors to coast, the switches LS1, G, LS2, P1, P2, P3 and P4 are opened, thereby disconnecting the motors from the power source. As indicated by the sequence chart in Fig. 4, the field shunting controllers F1 and F2 remain on position 5 during coasting, thereby maintaining the maximum field shunting condition which maintains minimum excitation of the motors.

At this time, the switches B1, B2, B3 and B4 are closed to establish dynamic braking connections for the motors. However, since the motors have a minimum amount of field excitation and all of the resistance in the accelerators A1 and A2 is connected in the dynamic braking circuits, only a small amount of braking current circulates through the motors during coasting.

As shown by the arrows in Fig. 3, the dynamic braking circuit for the motor TM1 extends from the armature winding 11 through conductor 46, switch B1, all of the resistor 33, one of the contact fingers 26 which is pressed against the bus 28 by the roller 31, one of the contact fingers 27 which is pressed against the bus 29 by the roller 32, all of the resistor 34, switch B2, conductor 48, the series field winding 14 of the motor TM2, conductor 51, switch B, a braking resistor 52, and conductor 53 to the armature winding 11 of the motor TM1.

The braking circuit for the motor TM2 extends from one terminal of the armature winding 12 through conductor 51, the switch B, the resistor 52, conductor 53, the series field winding 13 of the motor TM1, conductor 47, switch B3, all of the resistor 43, one of the contact fingers 36 which is pressed against the bus 38 by the roller 41, one of the contact fingers 37 which is pressed against the bus 39 by the roller 42, all of the resistor 44, switch B4 and conductor 49 to the other terminal of the armature winding 12.

If it is desired to increase the braking effect of the motors, the field shunting controllers F1 and F2 are operated from position 5 to position 1, thereby inserting the resistors 18 and 21 in the field shunting circuits step-by-step which increases the excitation of the motors TM1 and TM2 causing them to generate more dynamic braking current. After the field shunting controllers are returned to their "off" position, which opens the field shunting circuits, the accelerators A1 and A2 are operated from position 10 to position 1, thereby shunting the resistors 33, 34, 43, and 44 from the motor circuits step-by-step which controls the braking current in a manner well known in the art. The operation of accelerators during both acceleration and dynamic braking may be automatically controlled by means of current-responsive relays, thereby maintaining the motor currents at predetermined amounts.

It will be noted that the accelerators are operated in one direction during acceleration of the traction motors and in the opposite direction during dynamic braking, thereby simplifying the operation and control of the accelerators since it is not necessary for the accelerators to be returned to position 1 at the end of the accelerating cycle.

Furthermore, the accelerators are so utilized that it is not necessary to provide external resistors in the motor circuits which must be shunted by additional switches during the accelerating and braking cycles. Thus the control systems simplified since it is not necessary to provide for controlling the operation of additional resistor-shunting switches. The multi-step field shunting controllers provide for high speed running and braking regulation.

From the foregoing description, it is apparent that I have provided a simplified and improved system for controlling the series-parallel and dynamic braking operation of a plurality of motors. While the present system is particularly suitable for utilization on electrical vehicles, such as subway cars, it is not necessarily limited thereto.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a motor control system, in combination, a plurality of motors having series field windings, power conductors, switching means for connecting the motors to the power conductors, a plurality of accelerators for controlling the motor current, a reversible pilot motor for driving said accelerators in unison, switches cooperating with said accelerators to connect the motors first in series-circuit relation and then in parallel-circuit relation, and additional switches cooperating with said accelerators to establish dynamic braking connections for the motors, said accelerators being operated by the pilot motor in one direction during acceleration and in the opposite direction during dynamic braking.

2. In a motor control system, in combination, a plurality of motors having series field windings, power conductors, switching means for connecting the motors to the power conductors, a plurality of accelerators for controlling the motor current, a reversible pilot motor for driving said accelerators in unison, switches cooperating with said accelerators to connect the motors first in series-circuit relation and then in parallel-circuit relation, additional switches cooperating with said accelerators to establish dynamic braking connections for the motors, said accelerators being operated by the pilot motor in one direction during acceleration and in the opposite direction during dynamic braking, and multi-step controllers for shunting the series field windings.

3. In a motor control system, in combination, a plurality of motors having series field windings, power conductors, switching means for connecting the motors to the power conductors, a plurality of accelerators for controlling the motor current, a reversible pilot motor for driving said accelerators in unison, switches cooperating with said accelerators to connect the motors first in series-circuit relation and then in parallel-circuit relation, and additional switches cooperating with said accelerators to establish dynamic braking connections for the motors, said accelerators being operated by the pilot motor through part of their range of travel in one direction during series operation of the motors and through the remainder during parallel operation of the motors and in the opposite direction during dynamic braking.

4. In a motor control system, in combination, a plurality of motors having series field windings, power conductors, switching means for connecting the motors to the power conductors, a plurality of accelerators for controlling the motor current, a reversible pilot motor for driving said accelerators in unison, switches cooperating with said accelerators to connect the motors first in series-circuit relation and then in parallel-circuit relation, additional switches cooperating with said accelerators to establish dynamic braking connections for the motors, said accelerators being operated by the pilot motor through part of their range of travel in one direction during series operation of the motors and through the remainder during parallel operation of the motors and in the opposite direction during dynamic braking, and multi-step controllers for shunting the series field windings.

5. In a motor control system, in combination, a plurality of motors having series field windings, power conductors, switching means for connecting the motors to the power conductors, a plurality of accelerators having resistors for controlling the motor current, said resistors having a plurality of taps thereon, a reversible pilot motor for driving said accelerators in unison, switches connected to intermediate taps on said resistors for connecting the motors in series-circuit relation, switches connected to end terminals of said resistors for connecting the motors in parallel-circuit relation, and switches connected to the opposite end terminals of the resistors for establishing dynamic braking connections for the motors, said accelerators being operated by the pilot motor in one direction during acceleration and in the opposite direction during dynamic braking.

6. In a motor control system, in combination, a plurality of motors having series field windings, power conductors, switching means for connecting the motors to the power conductors, a plurality of accelerators having resistors for controlling the motor current, said resistors having a plurality of taps thereon, a reversible pilot motor for driving said accelerators in unison, switches connected to intermediate taps on said resistors for connecting the motors in series-circuit relation, switches connected to end terminals of said resistors for connecting the motors in parallel-circuit relation, switches connected to the opposite end terminals of the resistors for establishing dynamic braking connections for the motors, said accelerators being operated by the pilot motor in one direction during acceleration and in the opposite direction during dynamic braking, and multi-step controllers for shunting the series field windings.

7. In a motor control system, in combination, a plurality of motors having series field windings, power conductors, switching means for connecting the motors to the power conductors, a plurality of accelerators having resistors for controlling the motor current, said resistors having a plurality of taps thereon, a reversible pilot motor for driving said accelerators in unison, switches connected to intermediate taps on said resistors for connecting the motors in series-circuit relation, switches connected to end terminals of said resistors for connecting the motors in parallel-circuit relation, switches connected to the opposite end terminals of the resistors for establishing dynamic braking connections for the motors, said accelerators being operated by the pilot motor in one direction during acceleration and in the opposite direction during dynamic braking, and switches for causing bridging transition of the motors from series to parallel operation, said transition switches being closed when the accelerators are on said intermediate taps.

8. In a motor control system, in combination, a plurality of motors having series field windings, power conductors, switching means for connecting the motors to the power conductors, a plurality of accelerators having resistors for controlling the motor current, said resistors having a plurality of taps thereon, a reversible pilot motor for driving said accelerators in unison, switches connected to intermediate taps on said resistors for connecting the motors in series-circuit relation, switches connected to end terminals of said resistors for connecting the motors in parallel-circuit relation, switches connected to the opposite end terminals of the resistors for establishing dynamic braking connections for the motors, said accelerators being operated by the pilot motor in one direction during acceleration and in the opposite direction during dynamic braking, switches for causing bridging transition of the motors from series to parallel operation, said transition switches being closed when the accelerators are on said intermediate taps, and multi-step controllers for shunting the series field windings.

9. In a motor control system, in combination, a plurality of motors having series field windings, power conductors, switching means for connecting the motors to the power conductors, a plurality of accelerators having resistors for controlling the motor current, said resistors having a plurality of taps thereon, a reversible pilot motor for driving said accelerators in unison, switches connected to intermediate taps on said resistors for connecting the motors in series-circuit relation, switches connected to end terminals of said resistors for connecting the motors in parallel-circuit relation, switches connected to the opposite end terminals of the resistors for establishing dynamic braking connections for the motors, said accelerators being operated by the pilot motor in one direction during acceleration and in the opposite direction during dynamic braking, switches for causing bridging transition of the motors from series to parallel operation, said transition switches being closed when the accelerators are on said intermediate taps, and multi-step controllers for shunting the series field windings during parallel operation of the motors and during dynamic braking.

10. In a motor control system, in combination, a plurality of motors having series field windings, power conductors, switching means for connecting the motors to the power conductors, a plurality of accelerators having resistors for controlling the motor current, said resistors having a plurality of taps thereon, a reversible pilot motor for driving said accelerators in unison, switches connected to intermediate taps on said resistors for connecting the motors in series-circuit relation, switches connected to end terminals of said resistors for connecting the motors in parallel-circuit relation, switches connected to the opposite end terminals of the resistors for establishing dynamic braking connections for the motors, said accelerators being operated by the pilot motor in one direction during acceleration and in the opposite direction during dynamic braking, switches for causing bridging transition of the motors from series to parallel operation, said transition switches being closed when the accelerators are on said intermediate taps, and multi-step controllers for shunting the series field windings, said controllers being operated in the direction during parallel operation of the motors and in the opposite direction during dynamic braking.

LYNN G. RILEY.

REFERENCES CITED

The following references are of record in the file of this patent:

UNITED STATES PATENTS

| Number | Name | Date |
|---|---|---|
| 2,331,228 | Purifoy | Oct. 5, 1943 |
| 2,400,971 | Barclay | May 28, 1946 |